United States Patent [19]

Bonss

[11] Patent Number: 5,117,171
[45] Date of Patent: May 26, 1992

[54] METHOD AND APPARATUS FOR CONTROLLING A STEPPING MOTOR

[75] Inventor: Rainer Bonss, Buechenbach/Roth, Fed. Rep. of Germany

[73] Assignee: Robert Bosch GmbH, Stuttgart, Fed. Rep. of Germany

[21] Appl. No.: 534,037

[22] Filed: Jun. 6, 1990

[30] Foreign Application Priority Data

Jun. 7, 1989 [DE] Fed. Rep. of Germany ....... 3918538

[51] Int. Cl.⁵ ............................................. H02P 8/00
[52] U.S. Cl. .................................. 318/696; 318/685; 318/561; 318/567
[58] Field of Search ................ 318/696, 685, 561, 567

[56] References Cited

U.S. PATENT DOCUMENTS 4,536,691  8/1985  Sakakibara ........................ 318/696
4,600,868  7/1986  Bryant ................................ 318/567

OTHER PUBLICATIONS

IV. Controller and Driver ICs, Toshiba Corporation, TA8435H.

Primary Examiner—William M. Shoop, Jr.
Assistant Examiner—Saul M. Bergmann
Attorney, Agent, or Firm—Frishauf, Holtz, Goodman & Woodward

[57] ABSTRACT

A stepping motor having independently energizable windings for respectively producing magnetic fields at right angles to each other and directed at the axis of a rotor having a fixed polarity perpendicular to its axis, is operated so that the advance from one step to the next is produced by energizing one winding with a voltage producing a current continuously in one direction, while the voltage applied to the other winding is a rectangularly alternating voltage of a constant period and a gradually changing keying ratio. The roles of the two windings are interchanged between successive steps. A microcomputer for control of the motor has a pulse timing table and a program memory. Two control code memories are provided, one for specifying the direction of current in each of the windings during pulses of a sequence and one for specifying the direction of current in each of the windings during pauses between pulses of a sequence, as well as during an energized interval preceding the beginning of a pulsed step. The microcomputer times a switch which alternately connects a driving stage to the pulse and pause control memories. Smooth operation of the stepping motor without vibration or noise is economically obtained.

15 Claims, 7 Drawing Sheets

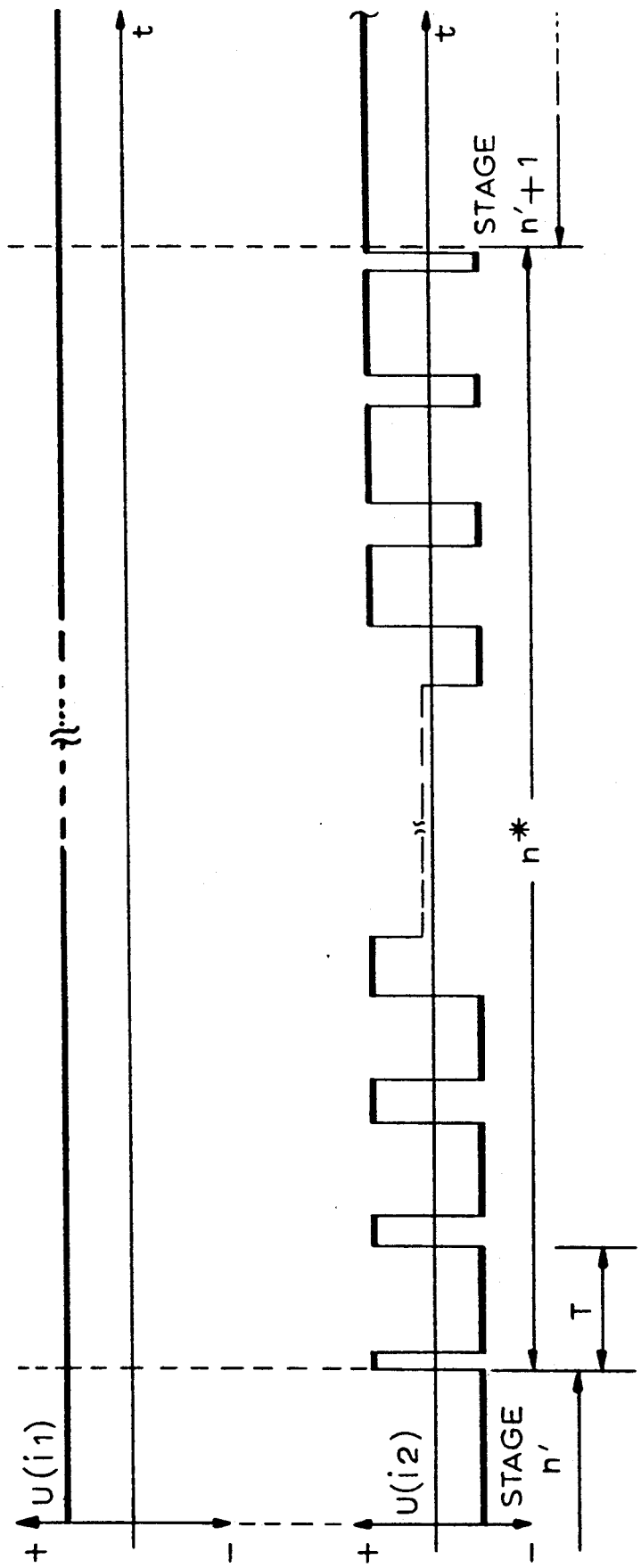

FIG. 6

| PULSE NO. IN SEQUENCE | PULSE DURATION [MS] | PAUSE DURATION [MS] |
|---|---|---|
| 1 | 0.2 | 0.8 |
| 2 | 0.3 | 0.7 |
| 3 | 0.4 | 0.6 |
| 4 | 0.5 | 0.5 |
| 5 | 0.6 | 0.4 |
| 6 | 0.7 | 0.3 |
| 7 | 0.8 | 0.2 |

| SECTOR | (PULSE) CONTROL CODE MEMORY 8 | | (PAUSE) CONTROL CODE MEMORY 7 | |
|---|---|---|---|---|
| | i1 | i2 | i1 | i2 |
| $n''$ | 1 | 1 | 1 | 0 |
| $n'' + 1$ | 0 | 1 | 1 | 1 |
| $n'' + 2$ | 0 | 0 | 0 | 1 |
| $n'' + 3$ | 1 | 0 | 0 | 0 |

FIG. 7

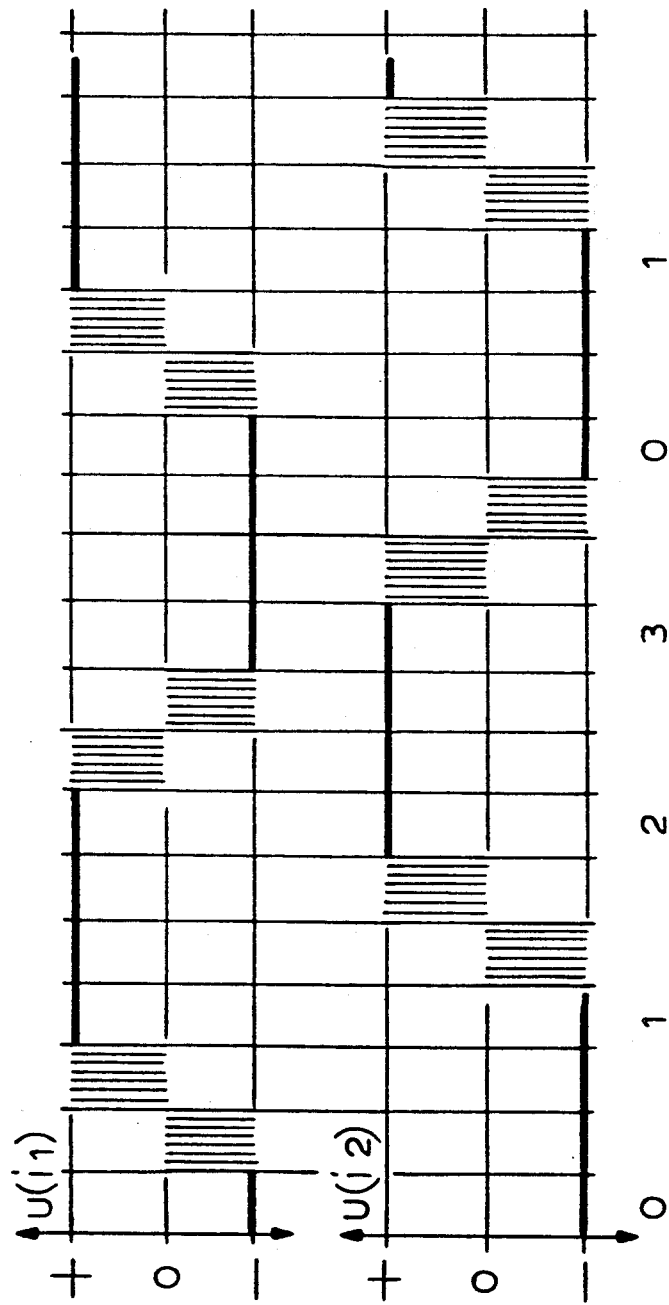

5,117,171

METHOD AND APPARATUS FOR CONTROLLING A STEPPING MOTOR

This invention concerns the driving of a stepping motor by applying pulses to its stator windings for stepwise rotary movement of its rotor.

Control circuits for such motors are known for energizing stepping motors so that the armature of the motor does not rotate continuously but advances intermittently step-by-step for whatever number of steps may be desired or prescribed. In such circuits at the beginning of a step the armature is accelerated by a current pulse, and, when it reaches the corresponding step position, it is braked. The acceleration takes place almost as a jump, apart from friction and inertia forces Such an event is repeated at every step until the number of steps is reached that is commanded by the control circuit.

With such control of a stepping motor the motor runs in a vibrating and unquiet manner. In the data booklet TA 8435H of Toshiba there is a block circuit diagram of an integrated circuit for smoothing the operation of a stepping motor by replacing the known rectangular pulse for providing a rotation step of the armature by a pulse in the shape of a step function which corresponds somewhat to the course of a sinusoidal half wave. Converting the pulse into a step function requires many microsteps by which the armature is then slowly accelerated and then decelerated. This circuit is expensive to provide and therefore too costly for simple applications.

SUMMARY OF THE INVENTION

It is the object of the present invention to provide a stepping motor drive with less jerking and quieter acceleration and deceleration in a manner which is simple and economical enough to be usable in a wide range of applications. Briefly, a sequence of several or many current pulses is provided for each rotation step of the rotor. This can be done with pulses of the same voltage amplitude. It is particularly effective for the of each sequence to have a continuously increasing duty ratio (of pulse duration to interpulse interval) from pulse to pulse, preferably with a constant period of pulse plus interval. In the usual case the pulse current and the interpulse pause current in a stator winding will flow in opposite directions.

The use of a constant voltage amplitude for the pulses of current is particularly convenient for the driving circuit. The continuous increase of the keying ratio provides the desired softness of acceleration and braking of the rotor in a highly practical way.

It is advantageous for the number of pulses per step to be chosen on the basis of the rotary speed of the rotor since the sequence must deal with the limitations imposed by the rotor speed at a high rotation rate.

It has been found favorable for a quiet operation to determine the number of pulses in a sequence with reference to the inertia and apparent rotary speed of a rotary drive system fixedly connected with the rotor. For example fewer and longer pulses are needed in the case great inertia, while many short pulses are useful to drive a low moment of inertia. There is thus advantage in selecting the average pulse length to accord with the inertia of the driven rotating mass. Thus there are simple solutions for the problem of fitting the pulse sequences to the characteristics of a stepping motor and whatever drive is mechanically connected to its shaft.

It has also been found desirable to provide pulse codes for controlling the movement of the armature rotor and to store certain pulsing information codes in two separate control-code memories. Then, with the control code memories connected to the stepping motor through a changeover switch, the control codes for the excitation of the coils can be called out in a simple way from the appropriate control code memory and supplied over the changeover switch to the stepping motor. The switch timing information is stored in the memory of a controlling microcomputer. Such an arrangement, as further described below, greatly simplifies the overall construction of the driving control circuit.

These advantages can be especially attractive for indicating instruments and apparatus which, on the one hand need to indicate measured values very precisely and, on the other hand, need to be capable of manufacture at an economical price.

BRIEF DESCRIPTION OF THE DRAWINGS

The invention is further described by way of illustrative example with reference to the annexed drawings, in which:

FIG. 5 is an expanded diagram of a portion of FIG. 3 showing a multipulse transition;

FIG. 6 is a first code table for explaining a practical operation of the method and apparatus of FIGS. 3, 4 and 5.

FIG. 7 is a second code table for explaining the same practical operation served by the first code table of FIG. 6.

DESCRIPTION OF THE ILLUSTRATED EMBODIMENTS

Figure 1:
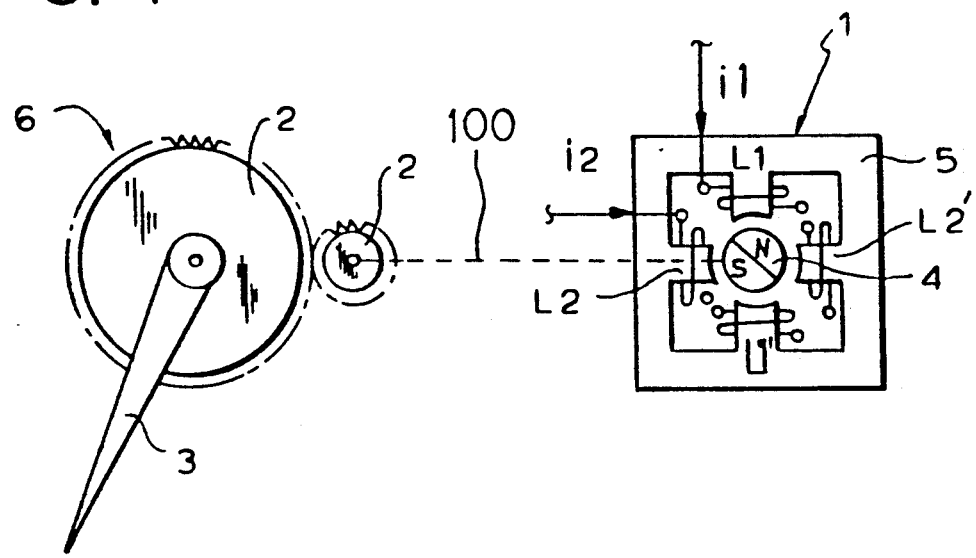
FIG. 1 is a schematic illustration of a stepping motor arranged to drive an indicating device.

FIG. 1 shows a stepping motor 1 for an indicating instrument 6. The motor has an iron core 5 having four poles. On two opposite poles of the core are wound the coils L1 and L1' for excitation by the current i1. On the other pair of opposite poles, directed at right angles to the first pair, are the coils L2 and L2' for excitation by the current i2. The magnetic fields of the two pairs of coils are used to rotate the rotor 4 about its axis 100 which is perpendicular to the drawing The direction of the magnetic field excited between opposite poles is determined not only by the direction of current, but also by the direction of winding. The armature 4 is mechanically connected to a drive 2 through which the indicator 3 of the indicating instrument 6 is driven.

When the motor is held at rest in the step or stop position shown in FIG. 1 the coils are energized so that the poles nearest the half of the rotor marked N (polarized north) will be polarized south. In a conventional drive illustrated in FIG. 2, if the position of the rotor shown in FIG. 1 corresponds to the stop position in stage n, the successive stages $n+1$, $n+2$ and $n+3$ have successive stop positions of the rotor in steps of $90°$. Return to stage n completes a revolution.

Figure 4:
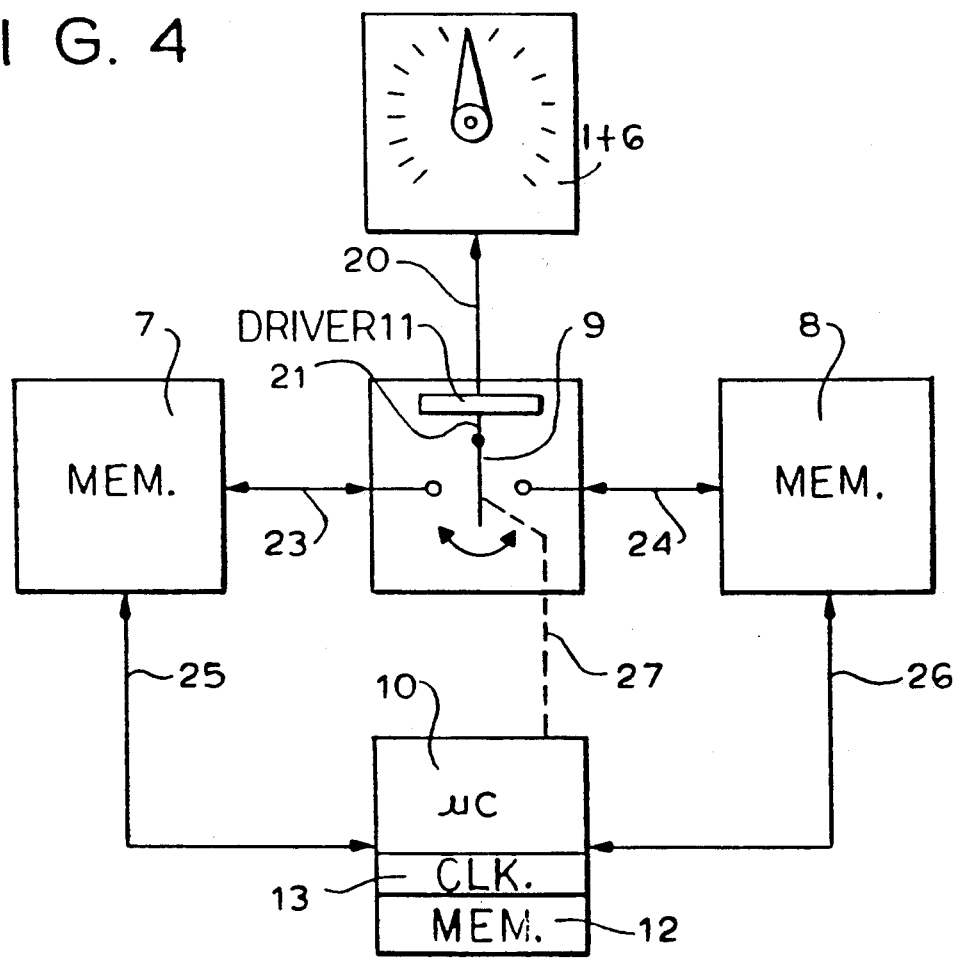
FIG. 4 (on the same sheet as FIG. 1) is a block circuit diagram of apparatus for carrying out the method of operation illustrated in FIG. 3.

FIG. 4 (on the same sheet as FIG. 1) is a block circuit diagram of an embodiment of the invention. It is not driven in the conventional way shown in FIG. 2, but in another way yet to be described. The instrument unit 6 of FIG. 4 represents not only an instrument such as the instrument 6 of FIG. 1, but also the stepping motor 1, which receives energization of its windings through a multiple conductor line 20 from driver stages 11, which are supplied with multiple inputs through a line 21 from the changeover switch 9. The changeover switch has multiple contacts, but is shown as a single switch just as the lines connecting the blocks of FIG. 4 are shown as single lines although there are multiple connections in each case. One set of contacts selectable by the switch 9 is connected to the control code memory 7 through the multiple line 23 and another set of selectable contacts of the switch 9 is connected to the control code memory 8 through a multiple line 24. The control code memories 7, 8 and the changeover switch 9 are controlled by a control circuit 10 through connections respectively shown at 25, 26 and 27, each, again, representing multiple connections.

Figure 8:
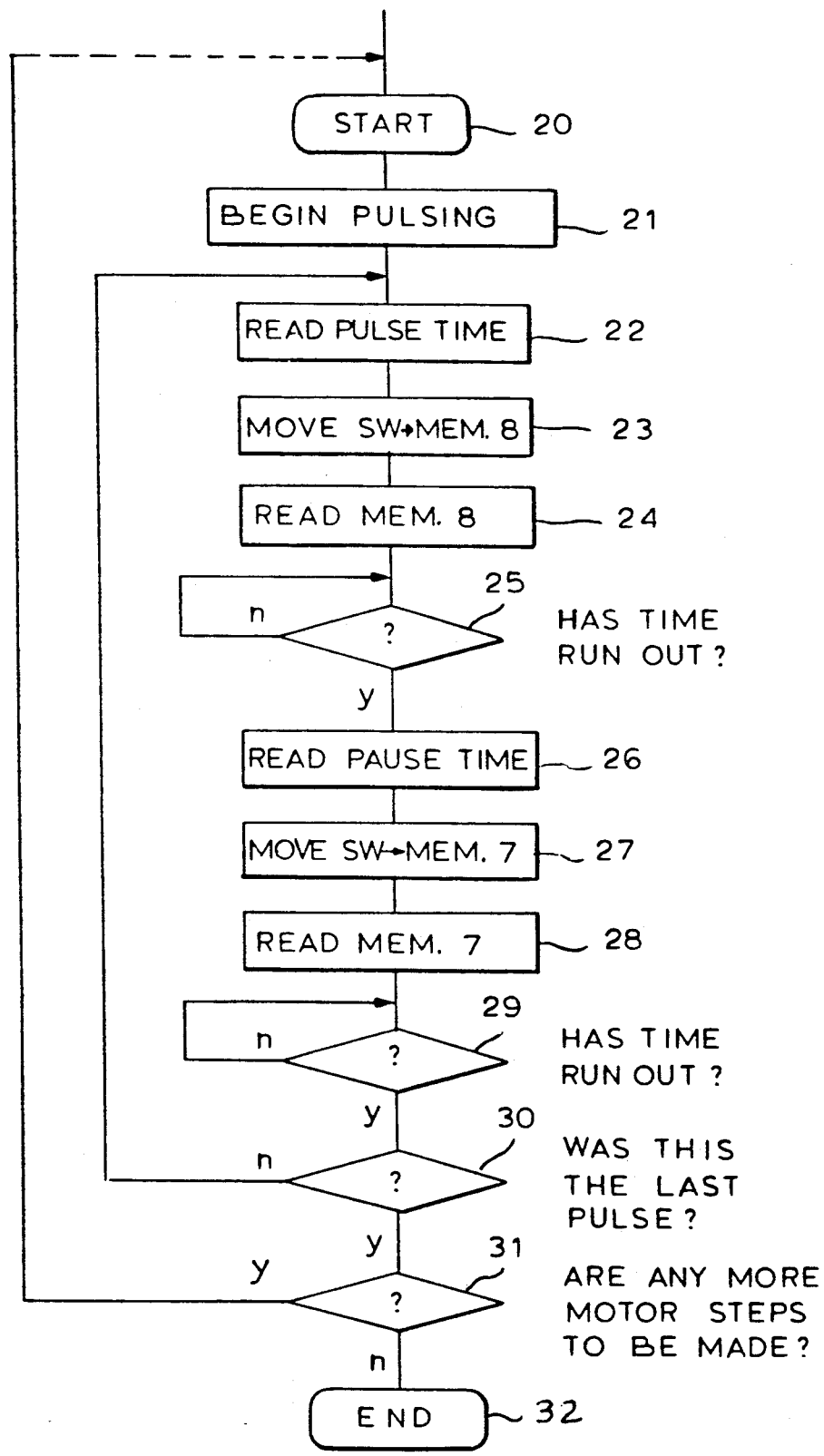
FIG. 8 is a flow diagram of the program for operating the memories 7 and 8 and the changeover switch 9 of the system of FIG. 4 in the manner conforming to the description of FIGS. 6 and 7, and FIGS. 9 and 10 are diagrams like FIG. 3 respectively showing a second and a third mode of operation of a stepping motor in accordance with the invention.

The control circuit 10 is a microcomputer $\mu C$ having a central processing unit, a memory 12 and a clock pulse generator 13. Timing information for producing a pulse sequence is contained in the memory 12. The microcomputer 10 is provided with a program also in the memory 12, for which the flow diagram is illustrated in FIG. 8. The control code memories 7 and 8 contain control code tables for controlling the driver stage 11 of the stepping motor.

The supply of the currents i1 and i2 for the stepping motor is provided in the driver unit 11 by the application of the necessary voltages control by the memories 7 and 8 through the changeover switch 9. The driver unit 11 which receives the control commands through the multipole switch 9 includes a driver stage connected to the switch for each of the windings L1, L1' and L2, L2'. The number of poles of the changeover switch may depend on the motor type or may depend upon the particular codes stored in the code tables. In any event the contacts of the changeover switch 9 are chatter-free switch contacts, so that they will generate no false pulses.

MANNER OF OPERATION

Figure 2:
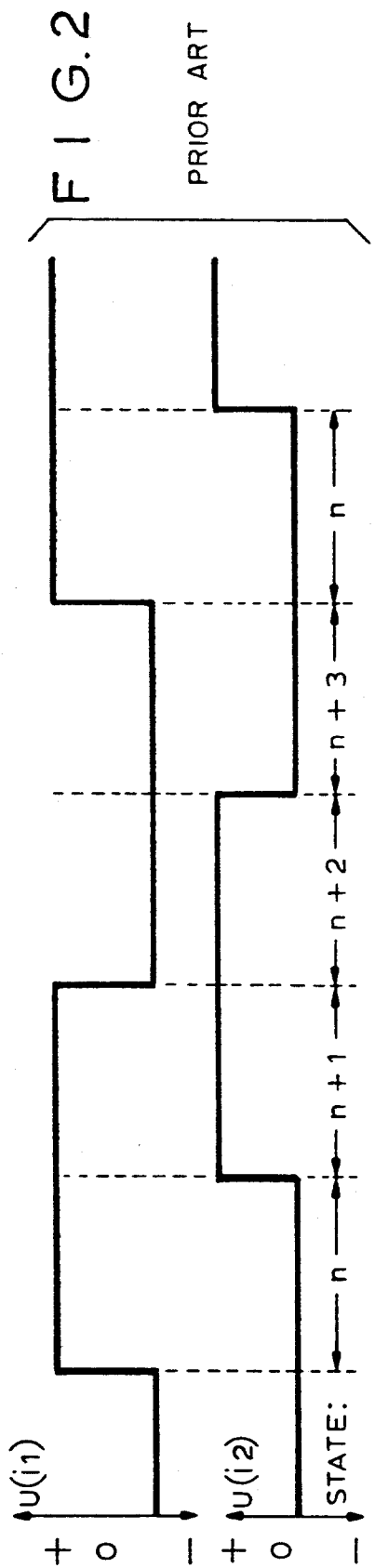
FIG. 2 is a basic diagram of a conventional pattern of voltage pulses for controlling current flow in the windings of the motor of FIG. 1 during a complete cycle of four steps.

FIG. 2 shows a conventional basic pattern of current for driving the rotor 4 of the stepping motor 1. The respective voltages providing the current i1 and the current i2 are shown plotted against a common time axis t. From this graph it is evident that the effective algebraic sum of the voltages applied to the rotor 4, jumps from one value to another at each step between the stages n, $n+1$, $n+2$ $n+3$ and so on. For example, the voltage producing the current 2 changes quickly in direction from $-$ to $+$ at the step from n to $n+1$, while att he step from $n+1$ to $n+2$ the voltage producing the current i1 reverses from $+$ to $-$. This provides a jolting movement of the armature. Even if the pulses were shortened to provide a brief interval of no applied voltage preceding and following each reversal of polarity, the sudden changes from full voltage to 0 voltage and vice versa, with only one pulse in each direction in each coil per revolution, would provide a jerking movement of rotation from one rest position to the next.

Figure 3:
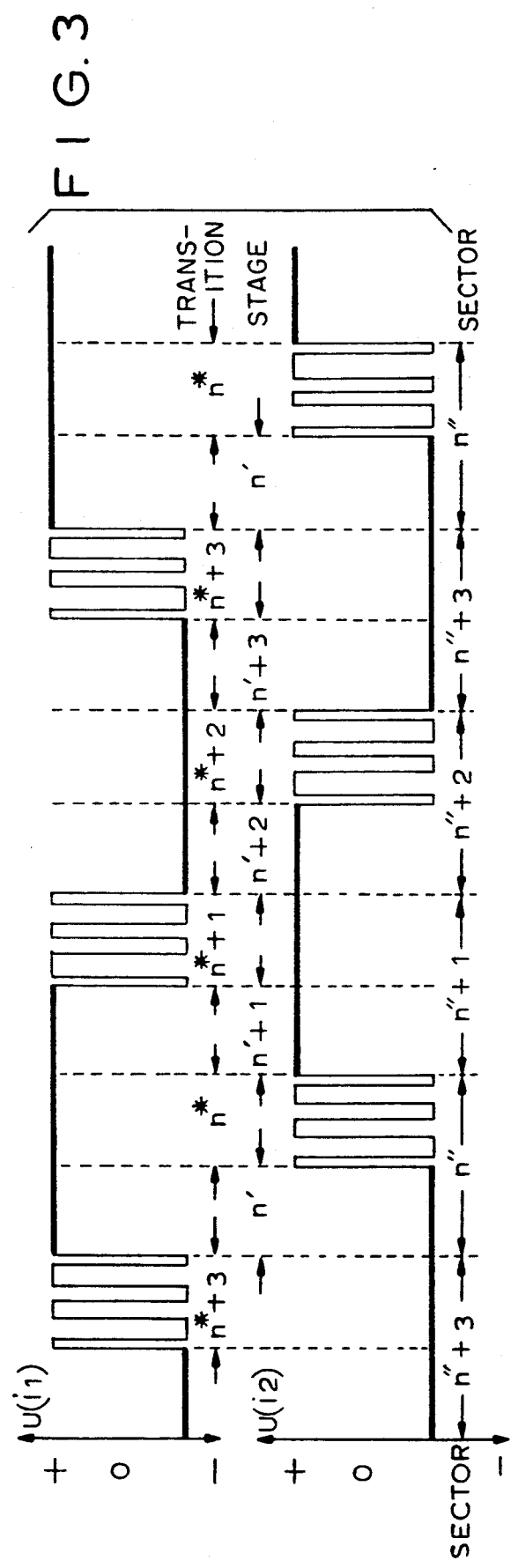
FIG. 3 is a simplified diagram of current flow of the windings of the motor of FIG. 1 for operation in accordance with the invention, on a time scale conforming to FIG. 2 for facilitation of comparison.

In order to accelerate the rotation of the rotor 4 smoothly and likewise to brake it smoothly, a control of the current pulses in accordance with FIG. 3 is provided by the invention.

FIG. 3 shows how the rest positions and intervals (hereinafter called stages) of the stepping motor of the invention differ from the rest positions and intervals of FIG. 2 and also how a stage n' together with a following transition interval n* defines a sector interval n" which is one of the four intervals used for the codes tabulated in FIG. 7. The transition intervals may be referred to as pulsing intervals and the rest intervals as non-pulsing intervals. The terms stages and sectors are used to avoid confusion with what are referred to as the states shown in FIG. 2.

FIG. 3, like FIG. 2 shows the voltages driving the currents rather than the current values themselves and, like FIG. 2, begins with a steady negative voltage driving the current i1 and a steady negative voltage driving the current i2. This pulls the rotor into one of the four rest positions described above in connection with FIG. 1. The sequence of rest positions is n', $n'+1$, $n'+2$, $n'+3$, n . . . in FIG. 3 and these step stages do not coincide fully with the step states n, $n+1$, . . . of FIG. 2.

Instead of a sudden switching of voltage from one value to another as in FIG. 2, FIG. 3 shows sequences of several pulses during transition intervals n*, $n*+1$, $n*+2$, $n*+3$ which respectively respective rest intervals (stages) n', $n'+1$, $n'+2$, $n'+3$ during which there are steady currents respectively the same as those that flow during the corresponding "state" periods in FIG. 2, which are designated n, $n+1$, $n+2$ and $n+3$. During each interval n*, etc., a pulse sequence makes a transition from one stage to the next of the sequence of stages n', $n'+1$, $n'+2$, $n'+3$, n', $n'+1$ . . . The maximum practical duration of such a pulse sequence is longer than illustrated in FIG. 3, i.e. the transition intervals could start somewhat earlier, but in order to assure some hesitation at each step, they should not be excessively lengthened. The length of the pulsing intervals n* etc., could also be shorter than shown in FIG. 3. FIG. 3 shows only a few pulses in each n* interval, but that is merely to simplify the drawing. There may be even more pulses than are shown on the larger scale drawing of FIG. 5.

The pulses shown in FIG. 3 are in the form of an alternating rectangular wave of constant period and amplitude with a gradually changing d.c. component produced by a varying duty ratio. With the preceding steady voltage taken as the base line, the sequence of pulses is a train of pulses at a steady repetition rate with a progressive change in duty ratio.

FIG. 3, like FIG. 2, shows both the voltages respectively driving the currents i2 and current i1. As already mentioned, between the pulsing intervals n*, etc., there are non-pulsing intervals n', etc., during which the currents i1 and i2 are both continuous.

FIG. 5 shows on an enlarged scale the pulsing interval n* which provides the transition from the rest position stage n' of FIG. 3 to the rest position stage $n'+1$ of FIG. 3. During all of the time interval illustrated in FIG. 5, i1 is driven at a steady positive voltage. Before the beginning of the pulsing interval shown, the current i2 is driven by a negative voltage and at the end of the pulsing interval shown the current i2 is driven in the reverse direction by a positive voltage, and it continues to flow in the same direction thereafter in rest position stage n'+1. The illustration in FIG. 5 of the pulsing during the transition interval n* differs from the representation in FIG. 3 by showing a much larger number of pulses in the transition interval In fact the middle of the diagram indicates that more pulses than are actually shown would in many cases make up the sequence. The number of pulses and the relative duration of the transition intervals n* are matters that can be adjusted to fit the particular case as further described elsewhere herein.

Figure 9:
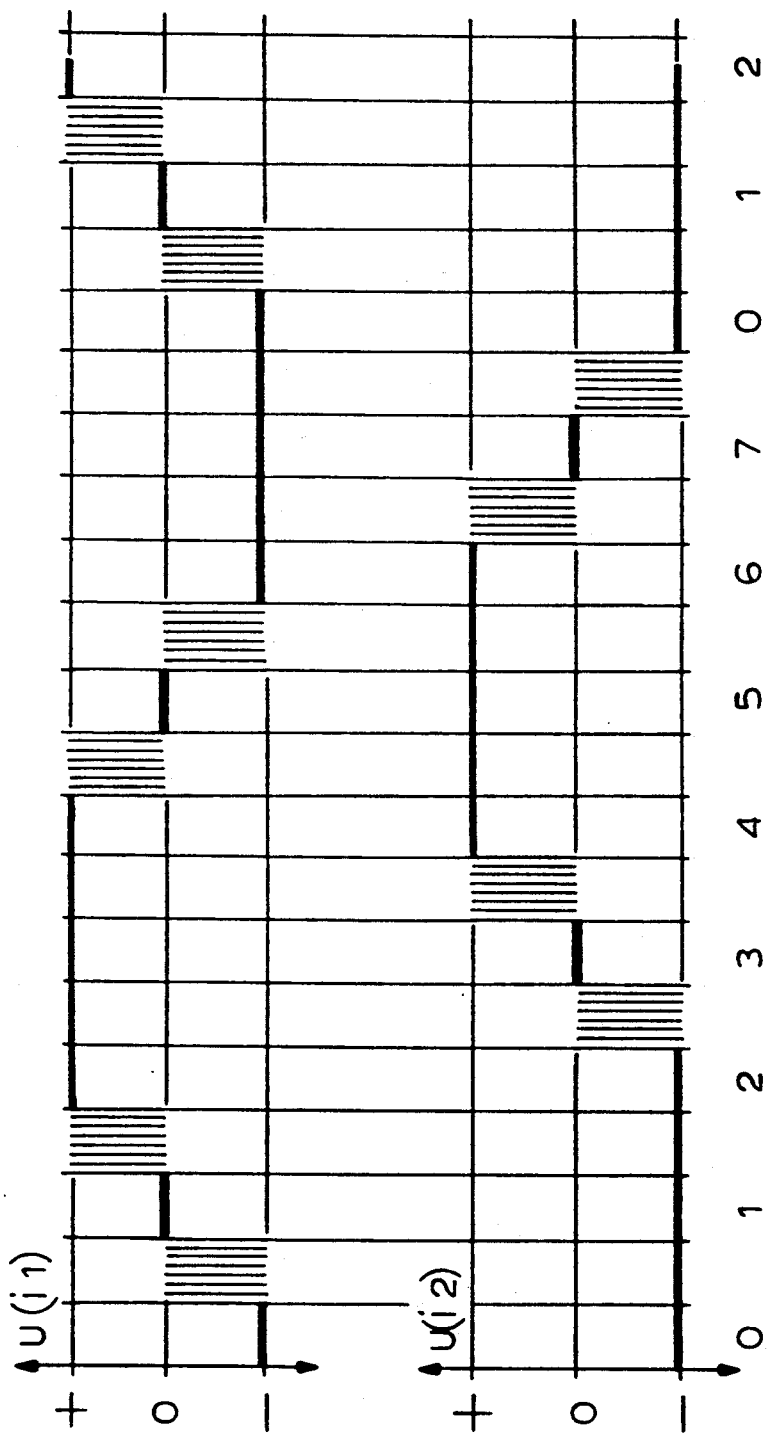

FIG. 5 also shows that if at the middle of the diagram there is, instead of additional pulses, an absence of current (driving voltage 0), what will result is a half-step motor with an intermediate rest position stage between the rest position stage n' and the rest position stage n'+1. Another type of half-step motor using the principles of the invention is illustrated in FIG. 9.

Every transition of i1 and i2 from a steady current at one voltage to steady current at an opposite voltage is produced by a continuous pulse sequence such as is schematically shown in FIG. 5. Under the influence of such a pulse sequence the rotor 4 is continuously accelerated as the pulse duration increases until a 50% duty ratio is approached.

When, as shown in the right-hand portion of FIG. 5, there is a combination of steady i1 current and a large duty ratio of the i2 pulses increasing beyond 50%, the armature begins to be braked. The overall effect of operation according to the invention thus produces a smoother and quieter operation of the motor while still preserving its stepping characteristic. If, as shown in FIG. 1, the armature rotor 4 is connected to a gearing-down drive 2 which rotates at pointer 3 of an indicating device, the pointer is moved forward without jerks. The direction of movement of the indicator 3, like that of the armature rotor 4 is determined by the direction of rotation of the magnetic field, which is determined by the relative polarity of the fields produced by the currents i1 and i2.

The number of current pulses in a sequence can be varied widely to suit the conditions of the particular application of the invention. It has been found favorable to determine the number of pulses in a transition and the relative amount of armature revolution respectively allocated to steady and pulsed voltages so as to suit the inertia system of the mechanical drive energized by the stepping motor.

If the mechanical drive system has a relatively large moment of inertia, relatively few and longer current pulses are sufficient to drive a system without jolting On the other hand, if the inertia is small, very many short current pulses finely graded in pulse length, at higher frequency, should be provided.

FIG. 6 is a table of pulse timing data and FIG. 7 is a table of current polarity data. Both of these tables have the address of the data at the left, a set of data for pulse durations in the middle and, at the right, a set of data for interpulse pauses In FIG. 6 the left-hand column shows the ordinal number of the pulses of each sequence, in this case 1, 2, 3 . . . 7 for a sequence of seven pulses. The middle column lists the pulse duration in milliseconds and the right hand column shows the pause duration in milliseconds.

The information of FIG. 6 shows the timing of a sequence of progressively changing current pulses stored, in the illustrated embodiment, in a code table portion of the memory 12 of the microcomputer 10. FIG. 6 is merely an example and any of a wide variety of pulsing patterns could be stored in the memory 12 so as to suit the particular case. The pulse duration and pause duration data are used by the microcomputer 10 to time the switching over of the switch 9 for the purpose of connecting the circuits of the driver stage 11 during pulses and interpulse pauses in accordance with the information stored in the control code memories 7 and 8 as set forth in FIG. 7 for the various sectors n", n"+1, n"+2 and n"+3 of the revolution of the motor. The tabulation of FIG. 7 specifies the polarity of the voltages which determine the directions of the respective currents i1 and i2 in the respective coil pairs L1—L1' and L2—L2', for the pulse durations in the middle part of the table and for the pause intervals in the right hand part of the table. The information for the pulse durations is stored in the control code memory 8 and the information for the pause intervals is stored in the control code memory 7. In the code table an entry 1 specifies that the applied voltage for producing the current is positive whereas an entry 0 specifies that the applied voltage for producing the current is negative Since FIG. 7 specifies the voltage producing the currents in both windings of the motor, each row of data corresponding to a sector specifies, for one of the windings, the same voltage polarity during a pulse and during a pause, and for the other winding specifies an applied voltage that reverses from pulse to pause. For example, in the sector n" polarity of the voltage producing the current i1 is the same during pulse and pause. The table of FIG. 7 also specifies the polarity steady voltages during the intervals (stages) when the switch 9 remains in the pause position. In this embodiment the pause condition is prescribed for the duration of stage n' which precedes the pulsing interval n* in the sector n", and similarly for the corresponding stages of the other sectors which precede the pulsing intervals of those sectors.

If now the rotor is to be moved from its position in the stage n' to its position in the stage n'+1 (first row of data in FIG. 7 - sector n") the voltage producing the current i1 will remain positive during the following pulsing interval n*, whereas the voltage producing the current i2 which would be negative voltage before the onset of the pulsing interval, would change to positive as soon as the switch 9, under control of the microcomputer 10 was switched over to the memory 8 to produce the first pulse, where it stays for 0.2 ms in accordance with the information in the first row of FIG. 6. This reversal of the voltage results from reading out the control code for the pulse on condition in the memory 8 for the sector n". The logic that translates the code into connections to provide the polarity of the voltage applied to the winding i2 can be either associated with the memory 8 or located in the driver unit 11. In any event, as soon as the control code is read in this first pulse in sector n" both currents i1 and i2 are switched on positive. At the end of the 0.2 ms pulse the microcomputer 10 causes the switch 9 to move over to the control code memory 7 for the duration of the first pause, in the illustrated case 0.8 ms. This results in the information for the first pause being read out from the memory 7, causing the voltage which produces the current i1 to remain positive but switching the current voltage which produces the current i2 over to negative direction of flow. At the end of 0.8 ms the second pulse can be similarly produced by first switching over to the control code memory 8, etc. These switching operations are continued in this manner until the entire pulse sequence has been produced.

After the last pause following a pulse of that sequence, the steady voltages producing the pause currents in the sector $n''+1$ are produced, but since the effect of the last part of the pulsing is to brake the rotor rather than to accelerate it, it is often already in the physical position corresponding to the step stage $n'+1$ and in any event will be held there by steady voltages briefly before the next pulsing sequence comes on, unless the motor has already reached the position at which it was commanded to stop. As many steps will be carried out in immediate succession until the position of the indicating device 6 has reached a value on its scale at which it was commanded to stop.

FIG. 8 shows in finer detail the programming steps of the microcomputer 10 involved in a single step of the motor (i.e. produced by a single pulsing interval).

The first program step is a start of the motor (which would be omitted when the motor is already running, so that the conditions for the step stage of the motor preceding a pulsing interval provides the start condition in the particular sector in which the rotor is located). It may be assumed that the motor is started in stage $n'$. After the start (step 20 of FIG. 8) a pulse sequence is initiated (step 21) as a result of which the code memory 12 is read out for the timing information (step 22).

Then, in step 23 the switch 9 is switched to connect with the control code memory 8 for the generation of the first pulse. In step 24 the code table of the memory 8 is read out and the corresponding voltages for the currents i1 and i2 are switched through the driver stage 11. The program halts in the position 25, while these voltages remain applied until the time for the current pulse has run out, as determined by the microcomputer 10, after which, in step 26 the duration of the following pause is read out from the code memory 12 and in step 27 the switch 9 is switched over to the control code memory 7. That switchover results, in step 28, with the driver stages 11 being switched in accordance with the pause information in the memory 7. In position 29 the program halts until the time provided for the pause has run out, at which time the first pulse period is complete and in step 30 an interrogation is made whether the pulse sequence is terminated. If that is not the case, the program jumps back to step 22 in order to initiate a new pulse period (with greater pulse width prescribed by the memory 12). That loop is run through as many times as necessary to complete the pulse sequence at which time the armature is in its position $n'+1$. In that position it is determined in step 31 whether additional rotary steps of the armature have been commanded and if so the program shown in the flow chart of FIG. 8 is restarted with step 20. If no more rotary steps of the motor had been requested the program is terminated in program step 32.

FIG. 9 shows a half-step motor in accordance with the invention with the usual 8 step positions 0, 1, 2 . . . 7. The pulsing interval transitions are shown in this figure simply by closely spaced vertical lines, but of course they are of the kind described with reference to FIG. 5. The steps 0, 2, 4 and 6 are the usual full steps and the intermediate half steps are 1, 3, 5 and 7.

FIG. 10 shows a mode of operation of a stepping motor that is a hybrid, partly a full-step motor and partly a half-step motor, with only the rest positions marked 0, 1, 2 and 3.

It will be evident, from the previous description with reference to FIGS. 1-8, how a stepping motor could be run in a manner illustrated in FIG. 9 or FIG. 10. A connection to a neutral voltage 0 will of course need to be specified. In the motors of FIGS. 9 and 10 the voltage is applied between a negative voltage and 0 for the portions of the operation diagrammed as being below the 0 line in these figures and between positive and 0 for the periods during which a particular winding is diagrammed in these figures as being above the 0 line.

In the modes of operation described herein the two windings of the motor contribute to motor operation in the same fashion. In all cases the pulse repetition rate (the reciprocal of the pulse period) of a pulse sequence can be adjusted in a manner dependent upon the rate of rotation and/or the inertia of the system driven by the stepping motor. The clock pulse frequency provided by the clock pulse generator 13 can conveniently be a high multiple of the pulse repetition rate.

In a further extension of the invention it is possible to provide stopping and starting the motor at any of many intermediate substeps between any pair of successive normal step positions.

Since in every pulse sequence the rotor advances by a small rotary displacement with every pulse, the pointer 3 of the indicating device 6 would go into a stable position if the particular pulse of the sequence at any moment would be identically repeated. When the pulse in question has a 50% duty ratio, its repetition would hold the pointer half way between successive rest positions and if the duty ratio is less or more, the pointer would be to one side or the other of that half way position. For making use of this property, the microcomputer 10 can be programmed to repeat the pulse and pause durations of a pulse of a particular ordinal number continuously, instead of advancing to the next pulse in the tabulation of FIG. 6, with continuous switching back and forth of the switch 9 in a repeating rhythm.

As already mentioned the relative amount of time taken up by the pulsing intervals can be suited to the inertia characteristics of the drive. The adjustment of the acceleration of the rotor can be made by the choice of the pulse length of an individual pulse. At a greater pulse length there is a stronger acceleration of the armature and with a short pulse length the acceleration of the armature will be correspondingly smaller.

Although the invention has been described with reference to a particular illustrative examples, it will be understood that other variations and modifications are possible within the inventive concept.

I claim:

1. A method of operating a stepping motor having a rotor and two sets of separately energizable stator coils, wherein each possible combination of application of equal voltage in either polarity respectively to said sets of coils defines a stopping position of said rotor and progressive rotation of said rotor is producible by applying waves of alternating polarity of the same value of voltage respectively to said sets of coils which waves differ substantially in phase and only in phase, said method comprising the steps of:

first applying to said sets of coils voltages of substantially equal magnitude and of respective polarities defining a first said stopping position of said rotor;

immediately thereafter applying a sequence of pulses produced by reversals of applied voltage polarity to a first one of said two sets of coils while a second set of said two sets of coils remains energized by continued application of the voltage previously applied thereto in the same polarity as before, said pulses of said sequence being of increasing duty cycle of the voltage polarity not applied to said first set of coils before the beginning of application of pulses, until a predetermined duty cycle between 50% and 100% is reached for a said pulse;

then terminating said pulse sequence by applying the voltage of the polarity of said predetermined pulse duty cycle to said first set of coils while said second set of coils remains energized by continued application of the voltage previously applied thereto in the same polarity as before, whereby said rotor is caused to reach a next one of its stopping positions with reference to said first stopping position;

then, unless it is desired to stop said rotor in said next stopping position, applying a second sequence of pulses produced by reversals of applied voltage polarity to said second set of said two sets of coils, while said first set of coils remains energized by continued application of the voltage previously applied thereto in the same polarity as before, said pulses of said second sequence being of increasing duty cycle of the voltage polarity not applied to said second set of coils during an interval ending with the beginning of application of pulses of said second sequence of pulses thereto, until said predetermined duty cycle between 50% and 100% is reached;

then terminating said pulse sequence by applying the voltage of the polarity of said predetermined pulse duty cycle of said second sequence of pulses to said second set of coils, while said first set of coils remains energized by continued application of the voltage applied thereto in the previous method step in the same polarity as in said previous method step, said rotor being caused, by this method step and the method step previous thereto, to reach a next one of its stopping positions, and then either stopping said rotor by continuing the application of voltages as specified in the preceding method step or cyclically repeating the foregoing steps of applying a sequence of pulses and terminating a pulse sequence, in the order above set forth, until a desired stopping position is reached and then stopping said rotor there by continued application of voltages applied in a pulse sequence termination method step without change of polarity.

2. A method of operating a motor having a rotor and two sets of separately energizable stator coils, wherein each possible combination of applications of equal voltage of either polarity respectively to said sets of coils defines a primary stopping position of said rotor and progressive rotation of said rotor is producible by applying waves of alternating polarity of the same magnitude of voltage respectively to said sets of coils which waves differ substantially in phase and only in phase, said method comprising the steps of:

first applying to said sets of coils voltages of substantially equal magnitude and of respective polarity defining a first said stopping position of said rotor;

immediately thereafter applying a first sequence of pulses to a first one of said set of coils of half said magnitude of voltage by interrupting a voltage of half said magnitude applied to said first set of coils and of the same polarity as the voltage applied to said first set of coils in the previous method step, while a second of said sets of coils remains energized by continued application of the voltage previously applied thereto, in the same polarity as before, the keying ratio of the interruptions of said half-magnitude voltage producing said pulses increasing from pulse to pulse until a predetermined interruption keying ratio between 50% and 100% is reached;

thereafter applying a second sequence of pulses of said half-magnitude of voltage to said first set of coils which pulses are offset by said voltage half-magnitude from said first sequence of pulses and are in the same polarity, by applying voltage to said first set of coils interrupted by pauses of no applied voltage with a keying ratio of applied voltage which increases from pulse to pulse until a predetermined keying ratio between 50% and 100% is reached, while said second set of coils remains energized by continued application of the voltage previous applied thereto, in the same polarity as before;

then terminating said second pulse sequence by applying voltage, at full magnitude, in the polarity of said predetermined pulse keying ratio, to said first set of coils while said second set of coils remains energized by continued application of the voltage previously applied thereto, in the same polarity as before, whereby said rotor is caused to reach a next one of its primary stopping positions with reference to said first stopping position;

then, unless it is desired to stop said rotor in said next stopping position, applying a third sequence of pulses to said second set of coils of half said magnitude of voltage by interrupting a voltage of half said magnitude applied to said second set of coils and of the same polarity as applied thereto in the previous method step while said first set of coils remains energized by continued application thereto of the voltage previously applied thereto in the same polarity as before, the keying ratio of the interruptions of said half-magnitude voltage producing said pulses of said third sequence increasing from pulse to pulse until a predetermined interruption keying ratio between 50% and 100% is reached;

thereafter applying a fourth sequence of pulses of half of said half-magnitude of voltage to said second set of coils which pulses are offset by said half-magnitude voltage from said third sequence of pulses and in the same polarity, by applying voltage to said second set of coils interrupted by pauses of no applied voltage with a keying ratio of applied voltage which increases from pulse to pulse until a predetermined keying ratio between 50% and 100% is reached while said first set of coils remains energized by continued application of the voltage previously applied thereto, in the same polarity as before;

then terminating said fourth pulse sequence by applying voltage, at full magnitude, in the polarity of said predetermined pulse keying ratio, to said second set of coils while said first set of coils remains energized by continued application of the voltage previously applied thereto, in the same polarity as before, whereby said rotor is caused to reach a further next one of its primary stopping positions, and then either stopping said rotor by continuing the application of voltages as specified in the preceding method step or cyclically repeating the foregoing steps of applying pulse sequences and terminating a pulse sequence in the order above set forth until a desired stopping position is reached and then stopping said rotor thereby continued application of voltages applied in a pulse sequence terminating method step without change of polarity.

3. The method of claim 2, wherein an additional method step is interposed between the method steps of respectively applying said first and second pulse sequences during which interposed method step no voltage is applied to said first set of coils, thereby leaving said first set of coils unenergized, while said second set of coils remains energized by continued application of the voltage previously applied thereto, in the same polarity as before, and a second additional method step is interposed between the method steps of respectively applying said third and fourth pulse sequences to said second set of coils, in which second interposed method step no voltage is applied to said second set of coils, thereby leaving said second set of coils unenergized, while said first set of coils remains energized by continued application of the voltage previously applied thereto, in the same polarity as before, said interposed method steps providing additional stopping positions of said rotor at which said rotor can readily be stopped by prolonging one or the other of said interposed method steps.

4. The method of claim 1, wherein in each said sequenced of pulses the pulse periods have a constant duration (T).

5. The method of claim 1, wherein the number of pulses in each said sequence is selected for being suitable to a characteristic rotary speed of operation of said rotor.

6. The method of claim 1, wherein the number of pulses in each said sequence is selected for being suitable to a characteristic rotary speed of operation of said rotor.

7. The method of claim 1, wherein the number of said pulses in each said sequence is selected for being suitable to the moment of inertia of a rotary mass load of which said rotor forms a part.

8. The method of claim 4, wherein the number of said pulses in each said sequence is selected for being suitable to the moment of inertia of a rotary mass load of which said rotor forms a part.

9. The method of claim 1, wherein within each said pulse sequence the change of duty cycle from pulse to pulse is selected to suit the moment of inertia of a rotary mass load of which said rotor forms a part.

10. The method of claim 4, wherein within each said pulse sequence the change of duty cycle from pulse to pulse is selected to suit the moment of inertia of a rotary mass load of which said rotor forms a part.

11. A stepping motor control system having an a rotor rotatable on an axis (100), a stator core, a first set of coils (L1, L1') mounted on said core for producing a magnetic filed directed perpendicularly to said rotor axis in a first direction, a second set of coils (L2, L2') mounted on said core for producing a magnetic field directed perpendicularly to said axis in a second direction which is perpendicular to said first direction, said first set of coils and said second set of coils each being independently energizable, and further comprising:

driving means having outputs connected to said sets of coils for energizing said first and second sets of coils independently by electric voltage, by which the directions of current flow through the respective sets of coils and the corresponding durations of flow in each direction are controllable electronically, said driving means also having an output and further comprising:

a microcomputer control circuit (10) having means, including a program memory, for controlling the presence, absence, direction and change of direction of voltage applied to each of said sets of coils, and having a timing memory for timing change of current direction in at least one of said sets of coils at a time;

first and second control code memories connected to said microcomputer control circuit and controllably connected to said driving means for independently energizing said sets of coils, and means for causing said driving means under control of said microcomputer control circuit, to produce any desired number of steps of sectoral rotation of said rotor in which each step is performed by applying a steady voltage of the same polarity to one of said set of coils while a programmed sequence of pulses in which the polarity of applied voltage alternates is applied in the other of said sets of coils with an increasing duty ratio for a polarity opposite to a polarity of a steady voltage which was applied thereto during an immediately preceding interval, and, in the event of a sequence of steps, by applying a steady voltage of said opposite polarity in said other set of coils while providing a sequence of pulses in which the applied voltage alternates in polarity to the set of coils to which a steady voltage was last supplied while said sequence of pulses was last taking place elsewhere.

12. The stepping motor control system of claim 11, wherein said first control code memory for each direction of operation, but not of said stepping motor, is constituted and connected for specifying the polarity of voltage applied to each of said sets of coils during a pulse of a said pulse sequence and said second control code memory is constituted and connected for specifying the polarity of voltage applied to each of said sets of coils during a pause between pulses of a said sequence, the pulse portion of a said sequence being defined for each direction of rotation of said rotor as the portion of a pulse period which increases in duration in a sequence provided for the performance of a particular motor step.

13. The stepping motor control system of claim 12, wherein a changeover switching means controlled by said control computer circuit in accordance with its timing program is provided for alternately connecting said code control code memories to said means for energizing said first and second sets of coils independently by electric voltage.

14. The stepping motor control system of claim 12, wherein said second control code memory also specifies the steady voltage applied to respective sets of coils in a coil energization period immediately prior to the beginning of each pulse sequence providing a different rotation step of a single revolution of said rotor.

15. The method of claim 2, wherein the step of applying said first pulse sequence to said first set of coils is immediately followed by the step of applying said second pulse sequence to said first set of coils, a trailing flank of the last pulse of said first pulse sequence being immediately followed by a leading flank of the first pulse of said second pulse sequence, and wherein the step of applying said third pulse sequence to said second set of coils is immediately followed by the step of applying said fourth pulse sequence to said second set of coils, a trailing flank of the last pulse of said third pulse sequence being immediately followed by a leading flank of said fourth pulse sequence.

* * * * *